(No Model.) 2 Sheets—Sheet 1.

O. MENGELBIER.
APPARATUS FOR REFINING SUGAR IN MOLDS.

No. 505,118. Patented Sept. 19, 1893.

WITNESSES:

INVENTOR
Oscar Mengelbier
BY
ATTORNEYS (No Model.) 2 Sheets—Sheet 2.

O. MENGELBIER.
APPARATUS FOR REFINING SUGAR IN MOLDS.

No. 505,118. Patented Sept. 19, 1893.

WITNESSES:

INVENTOR

ATTORNEYS

UNITED STATES PATENT OFFICE.

OSCAR MENGELBIER, OF PENCO, CHILE.

APPARATUS FOR REFINING SUGAR IN MOLDS.

SPECIFICATION forming part of Letters Patent No. 505,118, dated September 19, 1893.

Application filed October 14, 1892. Serial No. 448,905. (No model.) Patented in Germany December 23, 1891, No. 64,429, and in England March 24, 1892, No. 5,762.

*To all whom it may concern:*

Be it known that I, OSCAR MENGELBIER, manufacturer and engineer, a citizen of the Republic of Chile, South America, residing at Penco, Chile, have invented a certain new and useful Battery for Exhausting and Liquoring Masse-Cuite with a Measurable and Adjustable Amount of Cleare for Each Mold; and I declare that the following is a full and clear description thereof.

This invention has been patented to me in Germany, No. 64,429, dated December 23, 1891, and in Great Britain, dated March 24, 1892, No. 5,762.

My invention relates to a battery for exhausting and liquoring masse-cuite which renders it possible to use the cleare in measured and regulated quantity for each sugar mold as may be necessary for each boiling operation. The arrangement of the apparatus is such that in spite of the single sugar molds being connected to form a battery, each mold operates independently and can, when desired, be cut out.

The apparatus renders it possible to reduce the quantity of liquor to a minimum thus reducing the work to be done by the centrifugal machine and diminishing the work to be performed therein.

Figure 1:
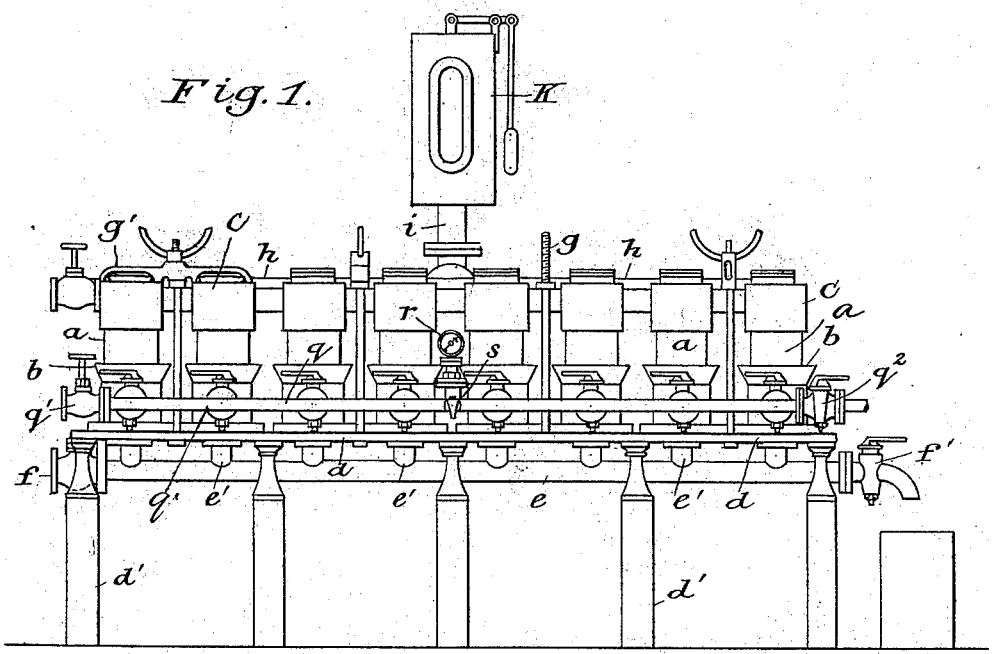
Figure 2:
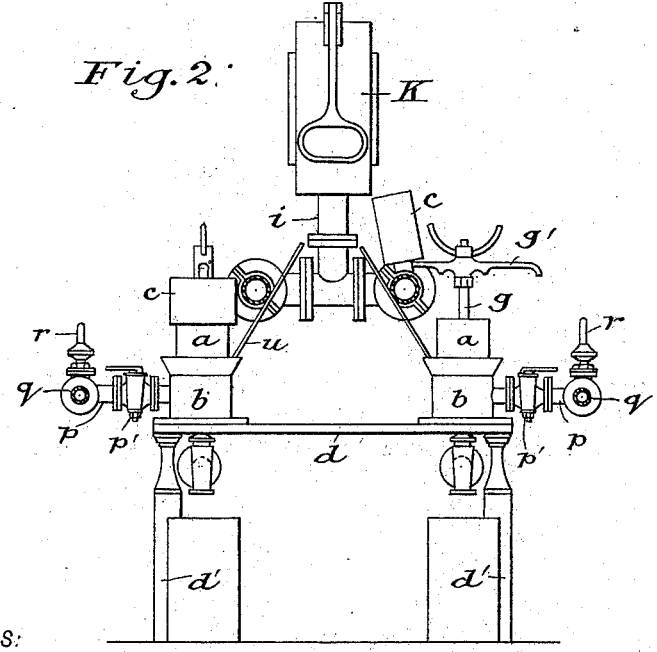
Figure 3:
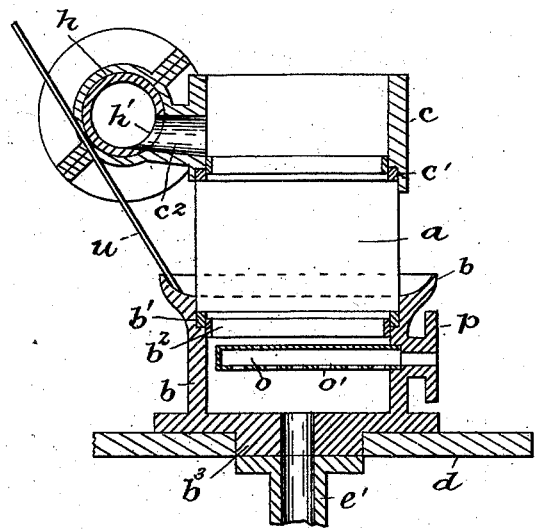
Figure 4:
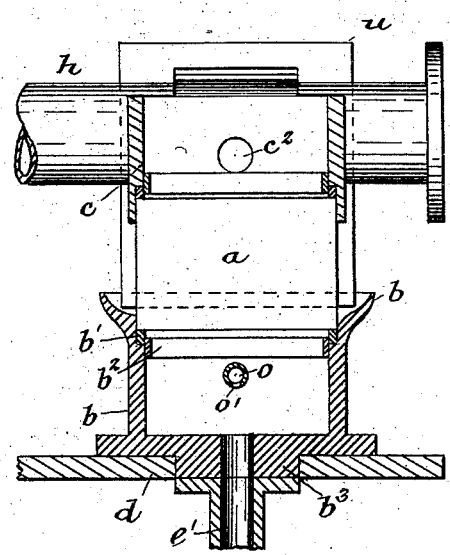

Figure 1 is an elevation of a battery constructed according to my invention. Fig. 2 is an end view of the same. Figs. 3 and 4 represent one mold of the battery in longitudinal and cross section on an enlarged scale.

The battery can be constructed in various ways according to the form of the sugar molds employed and the grouping of the same, one construction being represented in the accompanying drawings in which the sugar molds have an almost cubical form and are arranged in two parallel rows. Each of the sugar molds $a$ is placed on a suction box or receptacle $b$ which has an india rubber packing $b'$ held by strap iron $b^2$ and on which the lower edge of the sugar mold rests. The upper part of each mold $a$ is provided with a tight fitting hood $c$ which is open at the top and provided at one side with a tube $c^2$ through which the cleare necessary for each mold flows. The form of the suction box $b$ and the hood $c$ depends on the form of the sugar molds which can consist of the customary molds used in sugar factories, or of loaf molds.

In the battery like connection of the elements composed of the suction box $b$, sugar mold $a$ and hood $c$, the box $b$ is provided with an annular projection $b^3$ which fits into a recess in a plate $d$ carried by columns $d'$.

Pieces of tubing $e'$ are attached to the hollow projection $b^3$ of the suction box $b$ and are joined to the service pipe $e$ which is provided with suitable cocks or other devices which will permit the service pipes being cleaned by means of steam, or the green sirup or cleare being let off out of the service-pipe when the liquoring operation is finished. The hoods $c$ of each side of the battery are tightly pressed onto the molds $a$ by means of a bow or strap $g'$ screwed to the rod $g$. The hoods $c$ are by means of short tubes $c^2$ connected to a tube $h$ which is so fed with cleare from a liquor-measuring vessel $k$ by means of a feed tube $i$ that the cleare flowing from the measuring vessel, is uniformly distributed to all the hoods. The connection of the tube $h$ with the separate hoods is such that the connecting tubes $c^2$ which so embrace the perforated tube $h$ at $h'$ that each hood can be turned up (see Fig. 2), will in this position close the opening $h'$ leading to the hood so that no cleare can flow into this battery element, without simultaneously interrupting the connection between the cleare feed tube $h$ with the other elements.

In order to be able to use the apparatus for sucking of the green sirup preliminary liquor or pure cleare, each suction box $b$ is provided with a tube $o$ having upon its under side perforations $o'$ said tube being connected to a tube $p$ which is in connection with a tube $q$ leading to the air pump or suction apparatus, said tube $q$ being provided with suitable valves $q'$ $q^2$.

Each of the connecting tubes $p$ is provided with a cock $p'$ to cut off one of the single elements of the battery.

A manometer $r$ shows the degree of vacuum in the tube and can serve to control the uniform action of each element of the battery. The cock $s$ is intended to let air into the suction service without opening the closures $q'$ or $q^2$. The suction boxes $b$ are at their upper edges extended outward so that the cleare dripping from the raised hood c will be fed into the said suction boxes by means of the pieces of sheet metal u.

The operation of the apparatus is as follows: If the apparatus is to be used for sucking the green sirup out of the masse-cuite in the sugar molds the operation can be carried out without cleare, i. e., when the suction boxes b and hoods c are tightly closed onto the molds a and the cocks p', q² opened the green sirup is sucked off and fed by means of the suction boxes b into the tube e and from thence into the vessel t; or the operation can be carried out with a preliminary liquoring, for which purpose a quantity of cleare which has already been used once, or saturated sirups of higher quotients of purity than the green sirup to be driven off, is fed into the measuring vessel k from whence the sirup or liquor passes through the tube i into the distributing tube h in order to uniformly distribute the cleare or liquor to all the hoods c of the separate forms a. If suction is now employed, the cock f' being closed and the cocks p' opened, the green sirup driven out of the masse-cuite by the cleare or liquor into the tube e can be allowed to flow off. After this preliminary liquoring pure white cleare is allowed to flow from the measuring vessel and is uniformly distributed to all the sugar molds and this cleare sucked through the sugar mass so that the preliminary liquoring is driven off and a well liquored product obtained. The sucked off preliminary liquor is discharged and can be collected separately while the pure white liquor used can be obtained either by suction or by treating the molds a, (which after releasing the bow or strap g' and flapping up the hood c can be readily removed,) in a centrifugal machine. Should one of the elements of the battery or one of the molds a in consequence of same becoming leaky or for any other reason, operate irregularly, such element or mold can be readily cut out without in any wise interfering with the operation of the other elements or molds this being effected by releasing the bow or strap g' and flapping up the hood c so as to cut off all feed of cleare and by closing the cock p' between the element and the section service.

By employing my improved device I am able to economically use a part of the battery for the purpose as aforementioned according to the number of sugar molds to be operated on.

The equalization of the height of the cleare in the hoods is effected automatically on the principle of intercommunicating vessels in such manner, that as soon as a hood has received an excess of cleare, such surplus cleare will flow back into the tube and pass into another hood.

The position of the distributing tube h for the cleare is so arranged that the bottom of the same will be at the exact height with the line q corresponding with the height of the smallest quantity of cleare used.

Having now particularly described and ascertained the nature of my invention and the manner in which the same is to be performed, I declare that what I claim, and wish to secure by Letters Patent, is—

1. In a sugar mold the combination of a suction box, a mold, and a hood pivoted to swing upwardly, substantially as described.

2. In a sugar mold the combination with the mold a, the suction box b, adapted to receive the mold, of a supply pipe and a hood adapted to fit over the mold forming the connection between said pipe and mold, substantially as described.

3. In a sugar mold, the combination of the suction box b, having a flaring mouth, the mold fitting within the same and a pivoted hood fitting over the top of the mold, substantially as described.

4. In a sugar mold, the combination, with the mold, of a suction box having a flaring rim, a pivoted hood and a drip plate u, substantially as described.

In witness whereof I have hereunto signed my name in the presence of two subscribing witnesses.

OSCAR MENGELBIER.

Witnesses:
 EMIL GUNNION,
 ROBERT SONNTAG.